Figure 1:
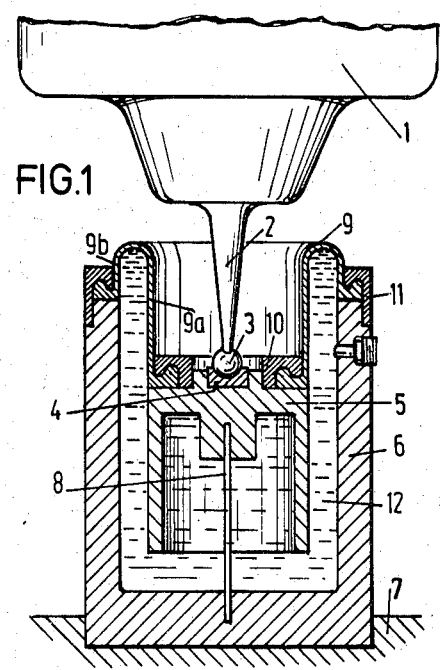

United States Patent
Wijnant et al.

[11] 3,813,134
[45] May 28, 1974

[54] VIBRATION DAMPERS
[75] Inventors: Petrus Leo Clemens Wijnant, Hertogenbosch; Richardus Theodorus Gerardus Louwaard, Alkmaar, both of Netherlands
[73] Assignee: Reactor Centrum Nederland (Stichting), The Hague, Netherlands
[22] Filed: June 23, 1972
[21] Appl. No.: 265,506

[30] Foreign Application Priority Data
June 25, 1971 Netherlands.................... 7108778

[52] U.S. Cl................................. 308/156, 308/159
[51] Int. Cl............................................ F16c 17/08
[58] Field of Search.......... 308/156, 158, 159, 141, 308/144, 145

[56] References Cited
FOREIGN PATENTS OR APPLICATIONS
848,710 9/1960 Great Britain...................... 308/156
29,900 4/1914 Great Britain...................... 308/159
696,807 1/1931 France................................ 308/159
351,039 5/1920 Germany............................ 308/156
188,792 4/1956 Austria................................ 308/159
188,791 4/1956 Austria................................ 308/159

Primary Examiner—Charles J. Myhre
Assistant Examiner—R. H. Lazarus
Attorney, Agent, or Firm—Cushman, Darby & Cushman

[57] ABSTRACT

A vibration damper for a fast spinning body of revolution rotating about a vertical axis, said vibration damper comprising a vessel filled with damping liquid, a radially movable damping member contained in said vessel and immersed in said liquid and a curling membrane forming an end wall of said vessel and attached with its one end portion to said vessel and with its other end portion to said damping member.

5 Claims, 4 Drawing Figures

PATENTED MAY 28 1974 3,813,134

VIBRATION DAMPERS

The invention relates to a vibration damper for a body of revolution mounted for rapid rotation about a vertical axis and supported by at least one bearing, said damper being adapted to be coupled with said bearing and comprising a hermetically closed vessel having one flexible end wall and being completely or except for some small gas bubbles completely filled with liquid and a damping member immersed in said liquid and extending along the vertical axis of said vessel, said damping member being attached to said end wall and adapted to move radially in respect of said vessel against a resetting force and said damping member resting on the upper end of a resiliently flexible road extending also along the vertical axis of the vessel and clamped with its lower end in a stationary part.

A vibration damper of this kind is disclosed in the Dutch patent application 66.07482 laid open for public inspection on 11 Dec. 1967. In this known vibration damper the flexible end wall is a diaphragm or a bellows. It has appeared that such a diaphragm or such a bellows has a noticeable influence on the behaviour of the vibration damper.

The invention has the object to make said influence of the flexible wall of the vessel on the damping characteristic negligibly small and this is achieved, in that said flexible end wall of the vessel is a curling diaphragm. Such a curling diaphragm is very flexible in radial direction, so that it does not contribute noticeably to the resetting force produced by the resiliently flexible supporting rod.

It has appeared that the influence of the curling diaphragm on the vibration damper is decreased and thereby the stability of the rotating body of revolution is increased, when the axially extending inner portion of the curling diaphragm is longer than the axial extending outer portion thereof.

A further amelioration is possible, when the inner portion of the curling diaphragm is attached to the damping member in or near the horizontal plane containing the tilting point of the damping member. In that case the radial movement of the inner end of the curling diaphragm is reduced to a minimum at radial vibration of the bearing of the rotating body of revolution.

The curling diaphragm permits in simple manner to vary the characteristic of the vibration damper. To effect such a variation of the damping characteristic the resiliently flexible rod may be axially movably clamped in the stationary part and means may be provided, whereby the position of said rod can be adjusted in respect of said stationary part. By varying the length of the supporting rod not only the resetting force produced by the latter but also the volume of the vessel is changed. Both factors influence the damping characteristic.

Figure 2:
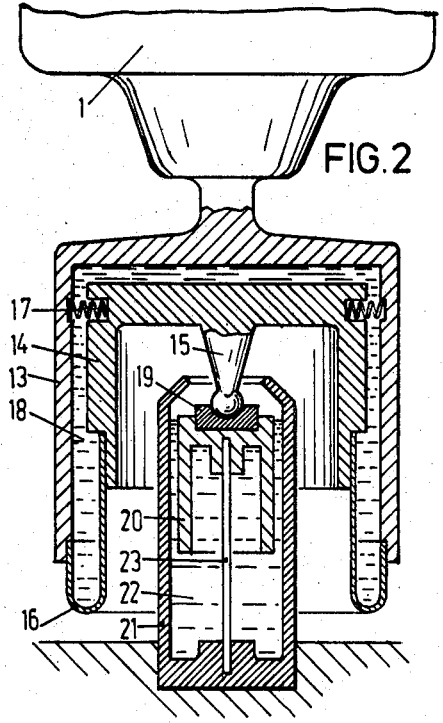
Figure 3:
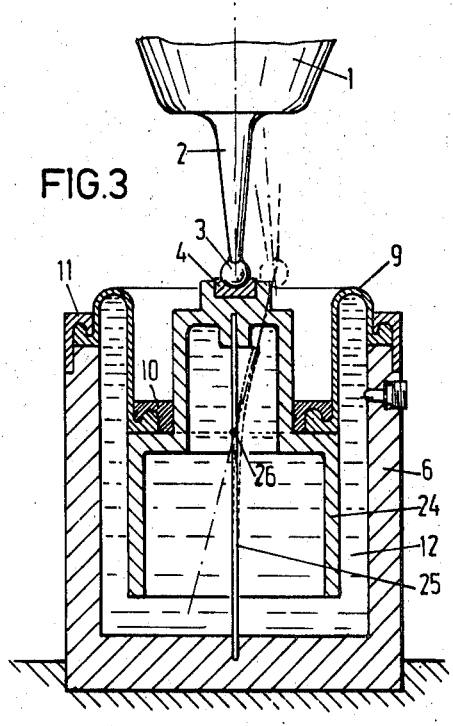
Figure 4:
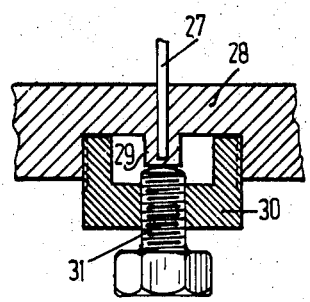

The invention will be further elucidated with the aid of the drawing. Therein is:

FIG. 1 an axial sectional view of a first embodiment of a vibration damper constructed in accordance with the invention;

FIG. 2 an axial sectional view of a second embodiment of such a vibration damper, FIG. 3 an axial sectional view of a third embodiment of such a vibration damper and FIG. 4 an axial sectional view of a device by means of which the length of the supporting rod of such a vibration damper can be somewhat increased.

In FIG. 1 a body of revolution mounted for rapid rotation about a vertical axis is designated by 1. This body rests by means of a pintle 2 having a spherical end portion 3 on a thrust bearing socket 4. This socket is attached to a damping member 5 of a vibration damper. This damping member 5 is provided in a vessel 6 which is completely or except for some small gas bubbles completely filled with liquid and is mounted on a stationary part 7. The damping member 5 rests on the upper end of a vertical resiliently flexible rod 8, of which the lower end portion is clamped in the bottom of the vessel 6. This rod 6 enables the damping member 5 to move radially when the rotating body of revolution 1 vibrates in radial direction. Said rod produces at the same time the radial resetting force.

The upper end wall of the vessel 6 is formed as a curling diaphragm 9, of which the cylindrical inner portion 9a is attached to the damping member 5 by a ring 10 and the outer concentric cylindrical portion 9b is secured to the rim of the vessel 6 by a ring 11. In order to increase the stability of the rotating body of revolution resting on the damper the inner portion 9a of the diaphragm is made longer than the outer portion 9b thereof. The space 12 within the vessel 6 is completely or except for some small gas bubbles completely filled with damping liquid. The liquid may not form a free level in the space 12. The curling diaphragm 9 is very flexible in radial direction, so that it cannot influence the resetting force.

In the embodiment shown in FIG. 2 the vessel 13 is attached to the body 1 and the damping member 14 is supported by the pintle 15. The lower wall of the vessel 13 is formed by the curling diaphragm 16. Springs 17 are provided to produce a radial resetting force. The space 18 within the vessel 13 is again completely filled with damping liquid. In this case the vibration damper constructed in accordance with the invention is situated completely in the axis of the rotating body of revolution 1, so that it rotates together with said body. The sphere of the thrust bearing rests in a socket 19 which is attached to the upper end of a second damping member 20. This second damping member is provided in a tubular vessel 21 containing damping liquid 22 and it rests on the upper end of a vertical resiliently flexible supporting rod 23.

The vibration damper illustrated in FIG. 3 differs from that shown in FIG. 1, in that the damping member 24 and the supporting rod 25 are lengthened upwards. In this embodiment the curling diaphragm 9 is attached to the damping member 24 in the transverse plane containing the tilting point 26 of the diaphragm. If during radial vibration of the body of revolution 1 the sphere 3 of the thrust bearing is moved in radial direction, the supporting rod 25 is bent and the damping member 24 is tilted about the point 26 (see the condition shown in dotted lines). The advantage of this construction is that during radial movements of the damping member 24 the curling diaphragm is hardly moved radially.

If the supporting rod 8 or 25 is adapted to move in axial direction it is possible to influence the damping characteristic. A slight lengthening or shortening of the supporting rod 8 has a noticeable influence on said characteristic. FIG. 4 shows means, whereby the supporting rod 27 can be made a little bit longer. To that end the supporting rod 27 is axially movably clamped in the bottom of the vessel 28 and the lower end thereof extends in a downward projection 29 of said bottom. A plug 30 is screwed in a recess of said bottom 28 and a bolt 31 is screwed through said plug. If the bottom 28 of the vessel and the projection 29 consists of ductile material, say of an aluminium alloy, it is possible to compress the projection 29 with the aid of the bolt 31 and to force thereby the supporting rod 27 slightly upwards. As a result thereof the active portion of the supporting rod 27 is lengthened and the volume of the vessel 6 is increased somewhat. Both factors influence the damping characteristic.

What we claim is:

1. In combination a body of revolution mounted for rapid rotation about a vertical axis on a thrust bearing which includes at least two cooperating relatively rotatable bearing members and a vibration damper comprising a vessel having a vertical axis which is substantially in line with the axis of revolution of said body, a damping member contained in said vessel and adapted to move radially therein against a resetting force, a radially flexible curling diaphragm surrounding the vertical axis of the vessel, said curling diaphragm having inner and outer vertical concentric cylindrical portions interconnected by an annular bent portion and being so attached only at and near its outer edge with the rim of the vessel and only at and near its inner edge with the end portion of the damping member nearest to said vessel rim, as to hermetically close the vessel and to allow the damping member to make radial movements, the space confined by the vessel, the damping member and the curling diaphragm being completely or except for some small gas bubbles filled with liquid, and a vertical resiliently flexible rod for applying said resetting force to the damping member, said rod having a lower end which is clamped in a stationary part and an upper end which supports the damping member, one of said bearing members and the damping member being rigidly interconnected.

2. A vibration damper as claimed in claim 1, in which the vessel is coaxially rigidly connected in upside down position to the lower end of the body of revolution and the damping member has the shape of an inverted cup and in which the bearing member attached to said damping member is a downwards pointing pintle having a spherical lower end, said pintle being rigidly connected to the bottom of the cup-shaped damping member, and the other bearing member is a socket for the spherical end of said pintle, said socket being attached to the upper end of and supported by said vertical resiliently flexible rod.

3. A vibration damper as claimed in claim 1, in which the axial dimension of the inner portion of the diaphragm is greater than the axial dimension of the outer vertical portion.

4. A vibration damper as claimed in claim 1, in which the damping member and the curling diaphragm are interconnected in or near a horizontal plane containing the tilting point of the damping member.

5. A vibration damper as claimed in claim 1, including means for adjusting the axial position of the resiliently flexible rod in respect of the stationary part in which said rod is clamped.

* * * * *